(12) United States Patent
Berstis (10) Patent No.: US 6,785,869 B1
(45) Date of Patent: Aug. 31, 2004

(54) METHOD AND APPARATUS FOR PROVIDING A CENTRAL DICTIONARY AND GLOSSARY SERVER

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/335,295

(22) Filed: Jun. 17, 1999

(51) Int. Cl.[7] .............................................. G06F 17/21
(52) U.S. Cl. ...................................... 715/532; 715/531
(58) Field of Search ................................ 715/530, 531, 715/532, 533, 501.1; 707/10, 201, 203

(56) References Cited

U.S. PATENT DOCUMENTS

| | | | |
|---|---|---|---|
| 5,410,695 A | 4/1995 | Frey et al. | 395/650 |
| 5,706,496 A | 1/1998 | Noguchi et al. | 395/603 |
| 5,737,617 A * | 4/1998 | Bernth et al. | 704/1 |
| 5,819,260 A | 10/1998 | Lu et al. | 707/3 |
| 5,875,443 A * | 2/1999 | Nielsen | 707/2 |
| 6,128,635 A * | 10/2000 | Ikeno | 715/532 |
| 6,345,245 B1 * | 2/2002 | Sugiyama et al. | 704/10 |

* cited by examiner

*Primary Examiner*—Stephen S. Hong
(74) *Attorney, Agent, or Firm*—Duke W. Yee; Jeffrey S. LaBaw; Richard J. Moura (57) ABSTRACT

A method and apparatus provides a central dictionary and glossary server. An application executing on a client is able to access a local copy of a dictionary or glossary. A master dictionary or glossary is updated at a server, and the update to the master dictionary or glossary is served to the application on the client to update the local copy of the dictionary or glossary. A datastream may also be processed by automatically scanning a datastream and automatically detecting, in the datastream, a word that cannot be matched to a word in a dictionary or glossary. The unmatched word is identified as an acronym, and in response, data associated with the acronym, selected from a hierarchical set of glossaries, is inserted into the datastream in close proximity to the acronym. In another aspect of processing a datastream, in response to an indication that the unmatched word is a properly spelled new term, a dictionary or glossary may be updated with the new term, and the dictionary or glossary is a member of a hierarchically ordered set of dictionaries and/or glossaries. The system may also contain an organizational database comprising information for organizational units associated with a data processing system, and each glossary in the hierarchical set of glossaries is associated with an organizational unit.

10 Claims, 7 Drawing Sheets

METHOD AND APPARATUS FOR PROVIDING A CENTRAL DICTIONARY AND GLOSSARY SERVER

CROSS-REFERENCE TO RELATED APPLICATIONS

The present invention is related to application entitled "METHOD AND APPARATUS FOR ACRONYM CHECKER AND AUTODEFINER", Ser. No. 09/306,192, assigned to the same assignee, and incorporated herein by reference.

BACKGROUND OF THE INVENTION

1. Technical Field

The present invention relates generally to an improved data processing system and, in particular, to a method and apparatus for processing documents and text streams.

2. Description of Related Art

Jargon is the bane of one's life in the modern world. Scientists and engineers are confronted with journals and papers that are filled with technical jargon. Government agencies produce voluminous reports with special terms and acronyms.

Many of these documents are written by persons familiar with technology but are not necessarily written by technical writers. Therefore, these documents are not written in a manner sympathetic to one who is unfamiliar with the subject matter. The documents tend to have many undefined terms that may include cryptic and undefined terms and acronyms. It may be difficult or impossible to read and comprehend a document with undefined terms.

The problem of simplifying technical papers grows steadily worse as technology marches onward. Although many corporations have attempted to incorporate open standards into their products, which results in some terms for proprietary technology becoming obsolete and unused, the number of special terms continues to increase rather than decrease. Technological growth spurs more technological innovation that requires special words to be coined for new concepts. As a result, more special terms or words are created.

The coining of new words and acronyms does not follow any particular rules, and there is no central authority that acts as a clearinghouse for reserving words. This state of affairs compounds the problem of new jargon because identically spelled acronyms may be created that have entirely different meanings. New words may be created within an organization that have different meanings depending on the person using the word and/or the context in which the word appears. It can then be especially difficult to determine which meaning was intended by the author of a document if the user is aware of two identically spelled words with different meanings.

Moreover, the definition or description of a new word or acronym for a newly developed concept or product may be slowly disseminated throughout an organization so that some persons understand a new term while others are unaware of its meaning.

Therefore, it would be advantageous to have a method and apparatus for rendering documents more readable. It would be further advantageous if the method and apparatus provided a user with the ability to understand documents in a manner that was reconciled to the user's context. It would be particularly advantageous if information about new terms were disseminated throughout an organization in a timely manner.

SUMMARY OF THE INVENTION

The present invention is a method and apparatus for providing a central dictionary and glossary server. An application executing on a client is able to access a local copy of a dictionary or glossary. A master dictionary or glossary is updated at a server, and the update to the master dictionary or glossary is served to the application on the client to update the local copy of the dictionary or glossary. A datastream may also be processed by automatically scanning a datastream and automatically detecting, in the datastream, a word that cannot be matched to a word in a dictionary or glossary. The unmatched word is identified as an acronym, and in response, data associated with the acronym, selected from a hierarchical set of glossaries, is inserted into the datastream in close proximity to the acronym. In another aspect of processing a datastream, in response to an indication that the unmatched word is a properly spelled new term, a dictionary or glossary may be updated with the new term, and the dictionary or glossary is a member of a hierarchically ordered set of dictionaries and/or glossaries. The system may also contain an organizational database comprising information for organizational units associated with a data processing system, and each glossary in the hierarchical set of glossaries is associated with an organizational unit.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
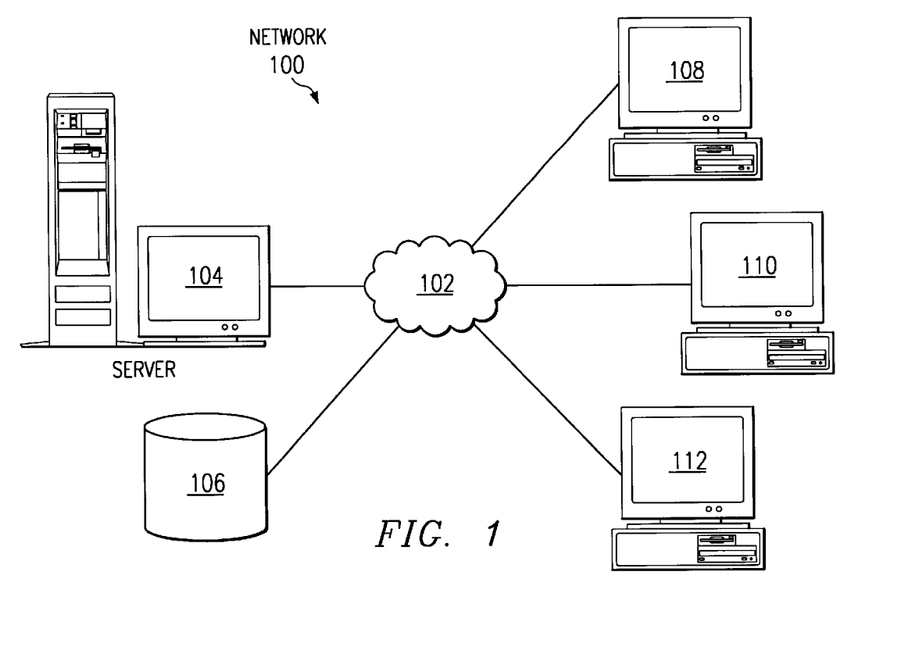
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
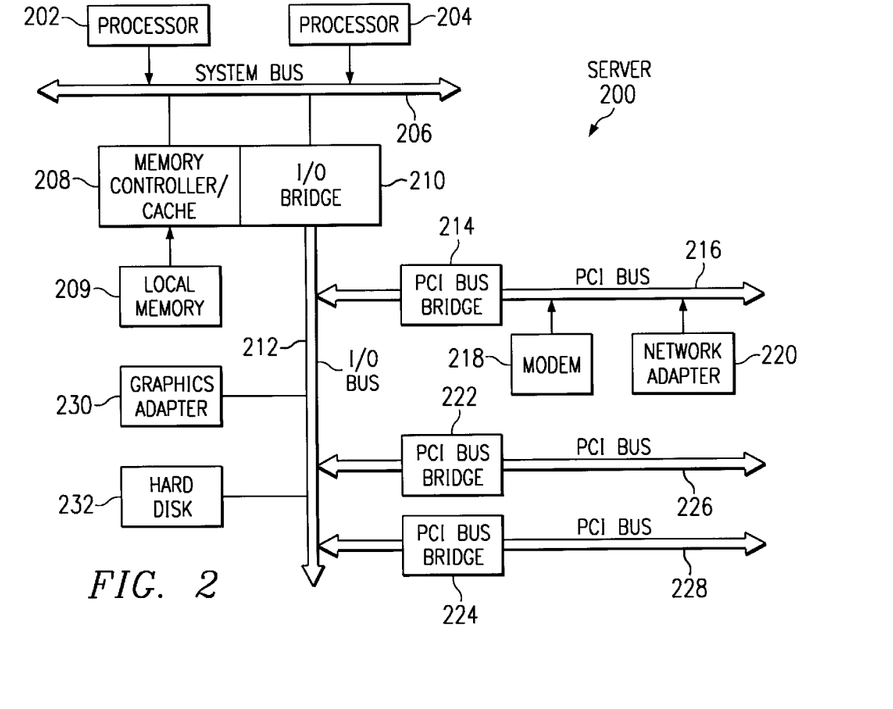
FIG. 2 is a block diagram depicting a data processing system, which may be implemented as a server.

Referring to FIG. 2, a block diagram depicts a data processing system, which may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
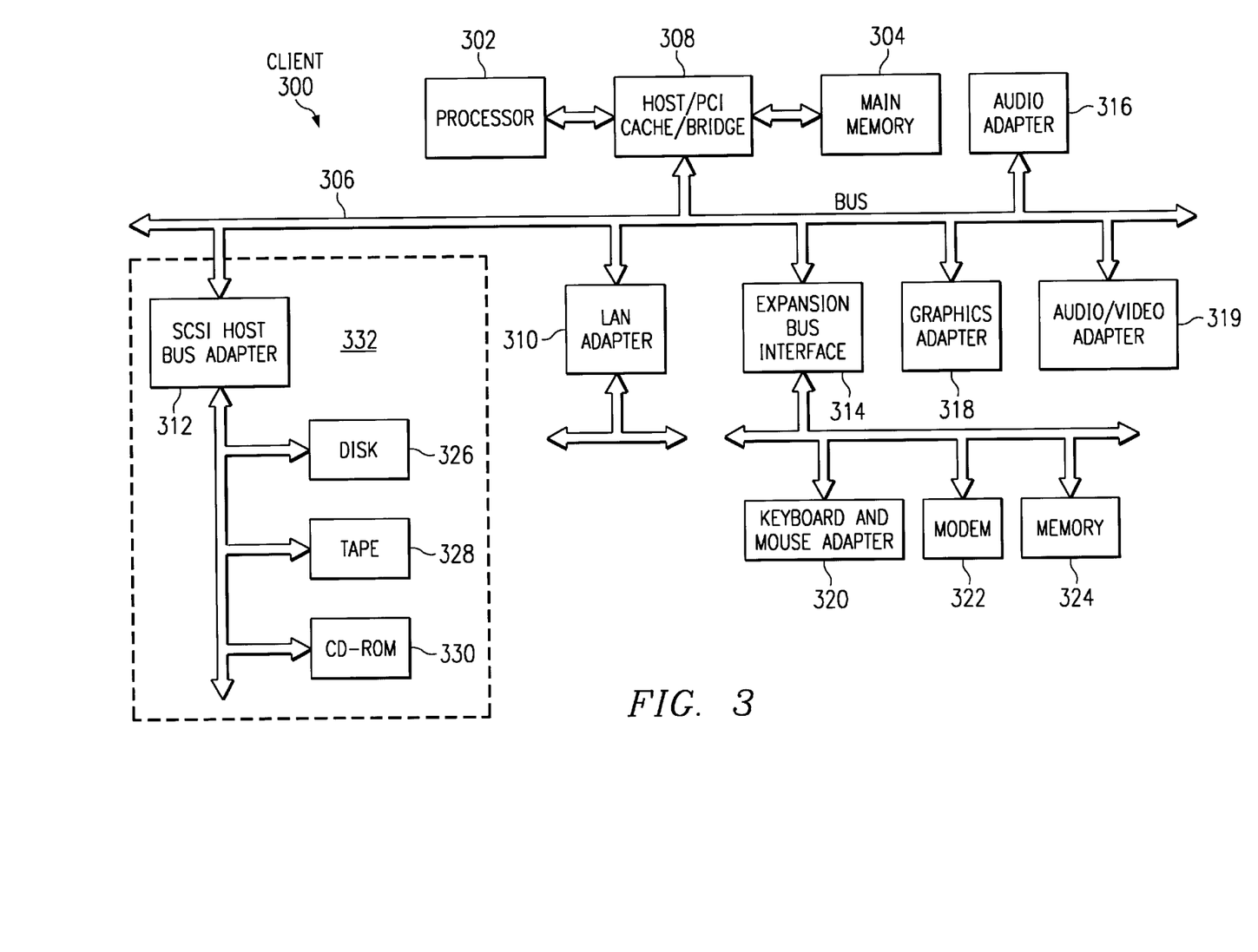
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide nonvolatile memory for storing operating system files and/or user-generated data.

The depicted example in FIG. 3 and above-described examples are not meant to imply architectural limitations.

The present invention uses a distributed data processing system similar to that shown in FIG. 1 to organize a set of hierarchically related glossaries. The various glossaries may be stored throughout an organizational network yet managed by a single server that is responsible for tracking, searching, and sorting the information stored in these glossaries.

Figure 4:
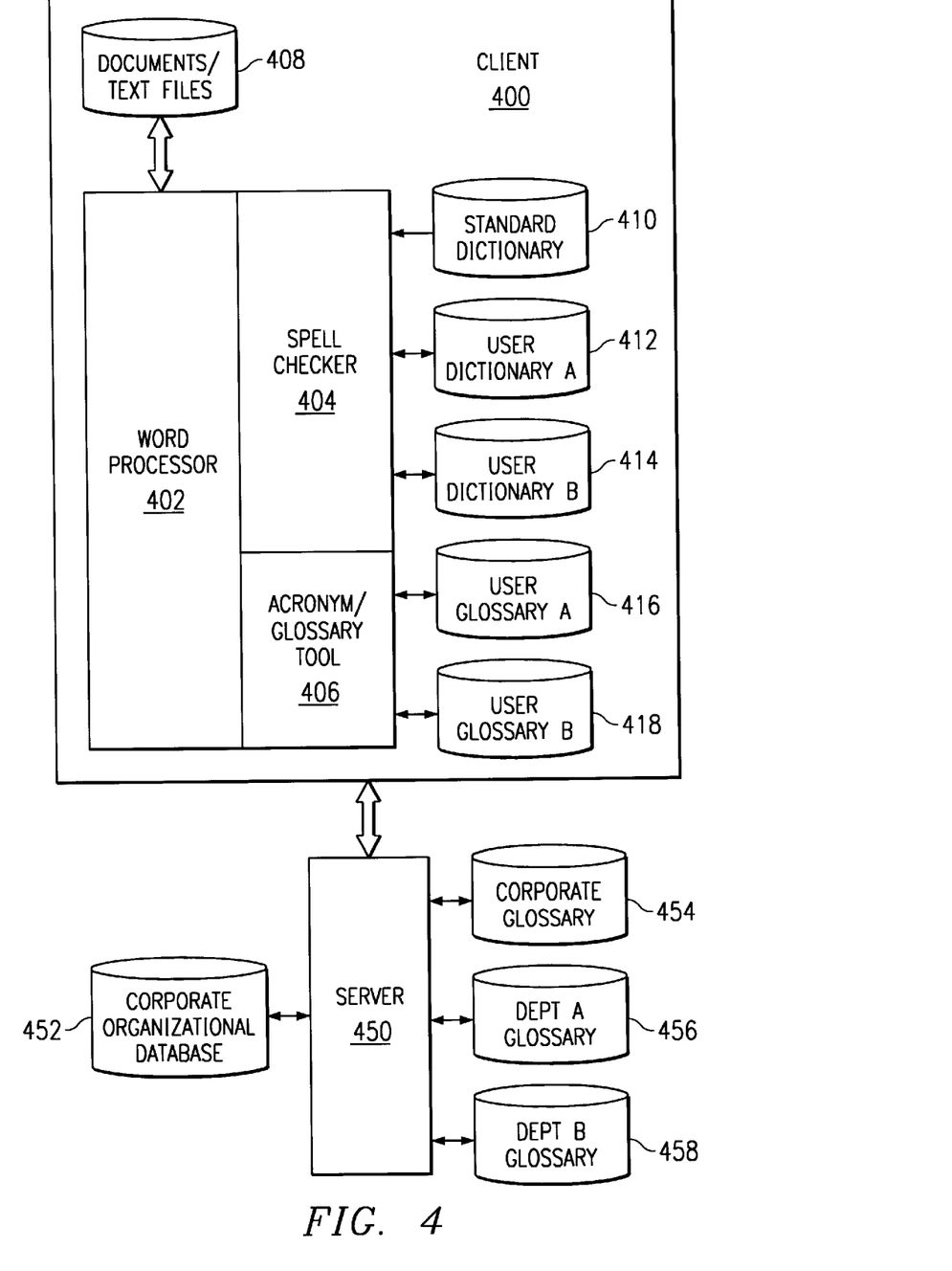
FIG. 4 is a diagram depicting an example for configuring a dictionary/spell checker and an acronym/glossary tool among other software components in relation to the storage of data files and information that may be accessed by each of the software components.

With reference now to FIG. 4, a diagram depicts an example for configuring an dictionary/spell checker tool and acronym/glossary tool among other software components in relation to the storage of data files and information that may be accessed by each of the software components. Client 400 contains applications 402–406 and data files 408–418. Word processor 402 reads and writes documents and text files 408. Spell checker 404 may access a variety of databases against which words in a datastream may be compared. Word processor 402 may invoke spell checker 404 to check the spelling of words within a datastream generated by reading documents and text files 408.

A datastream is an undifferentiated byte-by-byte flow of data. Streams may be input and output from a variety of devices, including storing the stream as a file or sending the stream to a display device so that the content of the stream may be presented to the user in a content window. As noted, a datastream may represent content retrieved from a file. However, a datastream may be derived from a variety of sources. For example, a datastream may be content retrieved according to a specific network protocol across a network or the Internet. A datastream may also be piped-output from a batch-processing program.

Spell checker 404 reads Standard Dictionary 410, User Dictionary A 412, and User Dictionary B 414, which provide lists of properly spelled words. Spell checker 404 may also store user-specified spellings of words in User Dictionary A 412 and User Dictionary B 414. User Dictionary A 412 and User Dictionary B 414 are editable and customizable to user preferred spellings of words and standard spellings of words not stored in Standard Dictionary 410.

Acronym/glossary tool 406 may be invoked by word processor 402 to perform processing on acronyms detected in datastreams generated by reading documents and text files 408. Acronym/glossary tool 406 may read and write User Glossary A 416 and User Glossary B 418. A glossary is an indexed list of terms or words found in or relating to a specific subject or text with explanatory words or phrases. Acronym/glossary tool 406 uses these glossaries to provide lists of previously defined acronyms. A standard glossary could be provided to acronym/glossary tool 406 in a manner similar to the provision of Standard Dictionary 410.

User Glossary A 416 and User Glossary B 418 may be user-customizable and user-editable so that the content of the glossary may be tailored to the specific use required by a user of the data processing system. Alternatively, one of these glossaries may be a standard glossary that contains acronyms used by the general public in a manner similar to Standard Dictionary 410 providing commonly used words. Acronym/glossary tool 406 may provide one glossary per document so that each glossary is tailored to the specific content of a single document.

Client 400 may communicate with server 450 to retrieve other glossary and dictionary information. Server 450 may respond to requests from client 400 by retrieving other information from databases 452–458.

Corporate glossary 454 may store all acronyms used within an enterprise or organization. As users at various client computers throughout the organizational network preferentially store acronyms in user glossaries, the acronym/glossary tool on each computer may send the new acronym to server 450 for storage in Corporate Glossary 454. The definitions and expansions of these newly stored acronyms may then be shared with other users throughout the organizational network.

Department A Glossary 456 may store all acronyms used within Department A of an organization. As users at various client computers throughout Department A preferentially store acronyms in user glossaries, the acronym/glossary tool on each computer may send the new acronym to server 450 for storage in Department A Glossary 456. The definitions and expansions of these newly stored acronyms may then be shared with other users throughout Department A. Department B Glossary 458 operates in a similar manner.

Although databases 452–458 are shown as glossaries, these databases may be alternatively configured as dictionaries. In that situation, unusual words, new words, special terms, and uncommon spellings may be stored and retrieved in a variety of locations within dictionaries stored on clients and servers.

Server 450 uses Corporate Organizational Database 452 to assist in the storage and retrieval of information in databases 452–458 from various users within the organizational network. Server 450 ensures that databases 452–458 are logically associated such that users view the information in the databases in a manner which reflects the corporate organization stored in Corporate Organizational Database 452.

The manner in which the present invention uses the organizational information is explained in greater detail further below.

Figure 5:
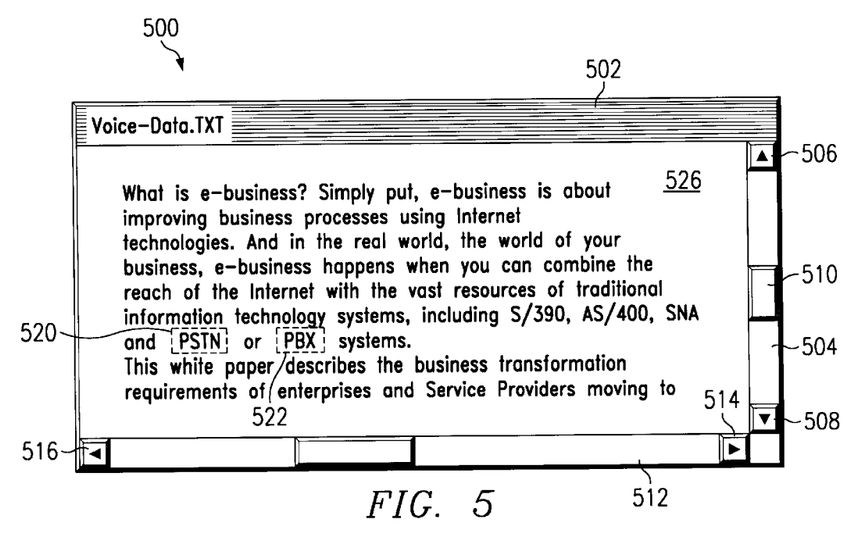
FIG. 5 is a diagram depicting a standard document window within a graphical user interface.

With reference now to FIG. 5, a diagram depicts a standard document window within a graphical user interface. Document window 500 contains title bar 502, scrollbars 504 and 512, and content area 526. Scroll bar 504 contains up arrow indicator 506, elevator 510 and down arrow 508 for scrolling the content area in a vertical direction in response to user manipulation of a pointing device such as a mouse. Scrollbar 512 contains left arrow 516 and right arrow 514 for scrolling the content area in a horizontal direction in response to user manipulation of a pointing device. Content area 526 has text that contains acronyms 520 and 522. An acronym is a word derived from the letters, a group of letters, or selected letters in a multi-word descriptive noun or other expression that often serves as a mnemonic. Acronyms may be used for corporate names, such as "IBM" for "International Business Machines". Other acronyms become common words in the vernacular, such as "PC" for "personal computer" and "RAM" for "Random Access Memory". In the example shown in content area 526, acronym 522 is "PBX", which stands for "Private Branch Exchange". Acronym 520 is "PSTN", which stands for "Public Switch Telephone Network".

Figure 6:
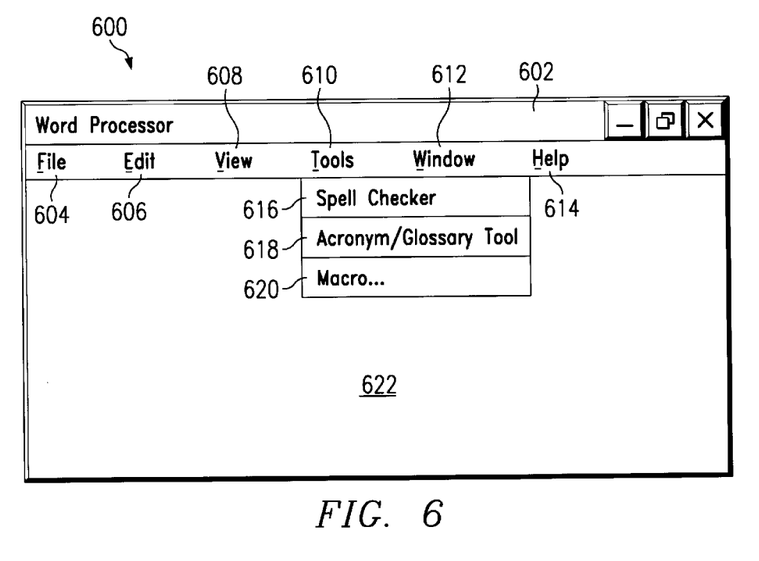
FIG. 6 is a pictorial representation of an application window depicting a manner in which an acronym/glossary tool may be invoked in another application.

With reference now to FIG. 6, a pictorial representation of an application window depicts a manner in which an acronym/glossary tool may be invoked in another application. Window 600 shows an application window for a word processor, which includes title bar 602, menus 604–614, and content area 622. File menu 604 contains menu items that provide file manipulation functions. Edit menu 606 contains menu items that provide editing functions. View menu 608 contains items that provide formatting functions for the content displayed in document windows. Tools menu 610 provides menu item access to various functions that may operate in conjunction with the word processor. Window menu 612 contains menu items that allow a user to manipulate various document windows within the word processor. Help menu 614 provides a user with access to help files.

Tools menu 610 contains "Spell Checker" menu items 616, "Acronym/Glossary Tool" menu item 618, and "Macro" menu item 620. Menus 616–620 may be selected in a manner that is well-known in the art for initiating the depicted function. In this example, a spell checker and an acronym/glossary tool are separately invokable functions. Alternatively, the spell checker and acronym/glossary tool may be combined so that the spell checking function and acronym/glossary checking function operate in conjunction within a single tool. As another alternative, the acronym/glossary checking function may operate within an Internet browser. Other well-known manners of invoking various functions within an application may be provided in accordance with the operation of the present invention.

Figure 7:
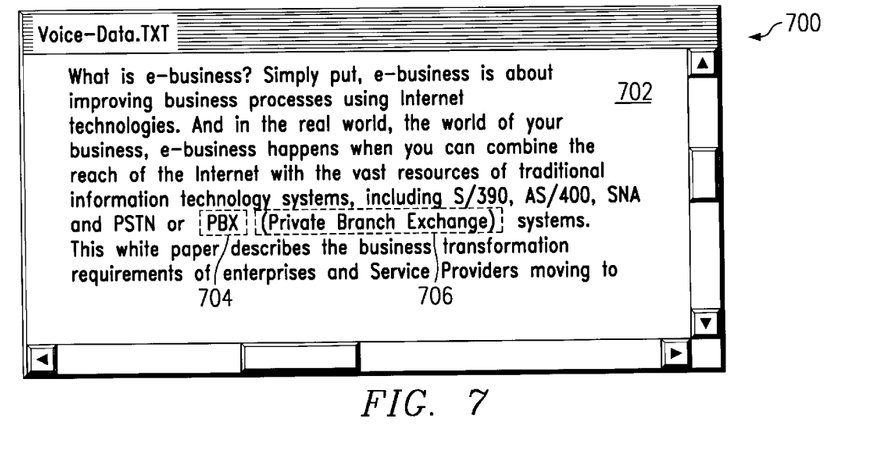
FIG. 7 is a pictorial document window depicting an acronym and its expansion within a datastream.

With reference now to FIG. 7, a pictorial document window depicts an acronym and its expansion within a datastream. FIG. 7 is similar to FIG. 5. Window 700 contains content area 702 that presents the content of a document to a user. The content area contains an acronym "PBX" and its expansion "Private Branch Exchange". Acronym 704 is immediately followed by acronym expansion 706. The expansion of acronym 704 may have been performed automatically by the acronym tool according to an option specified by a user within an acronym tool. In this example, the acronym tool has expanded acronym 704 by immediately following it with its expansion because the occurrence of "PBX" in content area 702 is the foremost occurrence of this acronym within the document of datastream. Alternatively, the expansion of an acronym may be placed in front of the acronym or at some other location in close proximity to the acronym, and the alternative placement may be selectable as an option by the user.

Figure 8:
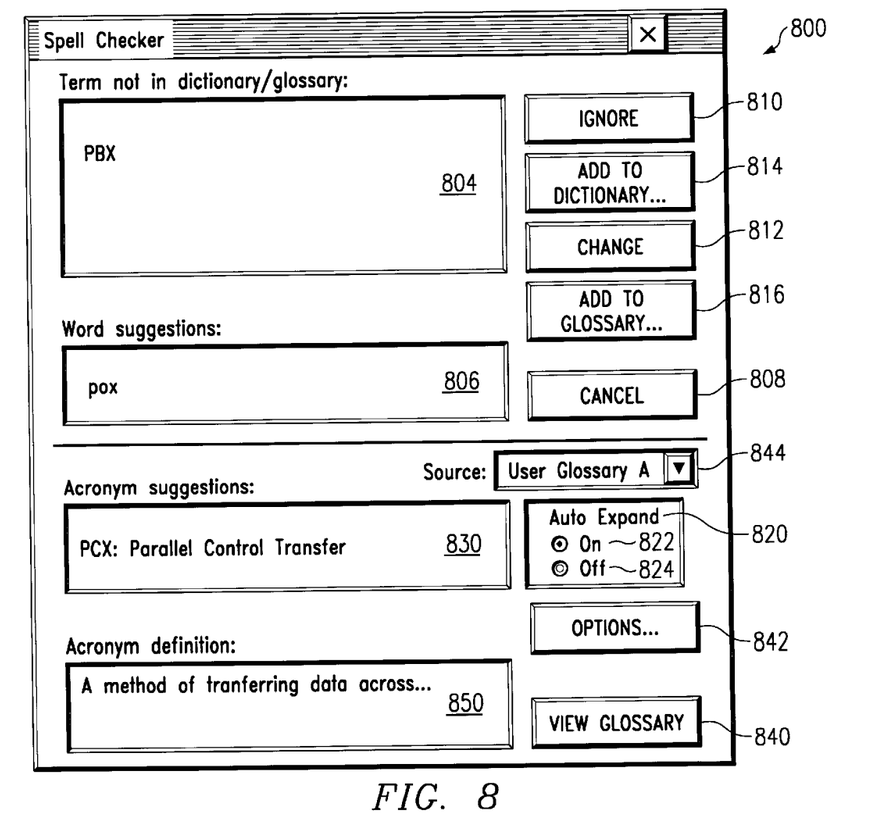
FIG. 8 is a pictorial representation depicting a dialog box for a tool that combines spell checking capabilities and glossary term processing capabilities.

With reference now to FIG. 8, a pictorial representation depicts a dialog box for a spell checking tool that may have been invoked in response to a user request. Window 800 may be presented to a user in response to a user selection through a menu similar to that shown in FIG. 6. Window 800 combines the functionality of a spell checker and an acronym/glossary tool.

At the point in time at which a dialog box similar to window 800 appears, the spell checker tool has scanned the words present in a document window of a word processor in order to determine whether any of the words are misspelled. Words that have not been identified as correctly spelled words or as previously defined acronyms or special terms are presented to the user within window area 804.

In this case, the word "PBX" has been located within the document window but has not been matched with any words in any of the dictionaries or with any acronyms or special terms in any of the glossaries. Properly spelled words are suggested to a user in window area 806. In this example, the word "POX" has been suggested to the user as a replacement word for the unidentified word "PBX". The spell checker tool identifies potentially misspelled words and suggests to the user properly spelled words.

If the user believes that the word is properly spelled or is an undefined acronym or special term, the user may select IGNORE button 810. Selection of the IGNORE button informs the spell checker that the currently unidentified word, acronym, or term should be ignored by the spell checker, and the spell checking function should continue scanning for misspelled words within the current document.

If the user believes that the unidentified word is a correctly spelled word, then the user may select "ADD TO DICTIONARY" button 814 that informs the spell checker to add the unidentified word to one of the dictionary files as a correctly spelled word. Subsequent comparisons between the current word and the modified dictionary will result in a positive identification of the word so that it is not flagged as a misspelled word.

When the user requests to add the word to a dictionary, the spell checker may first store the new word in the local dictionary, most likely in a user dictionary associated with the current user. The spell checker may also attempt to disseminate the new word throughout an organization by sending the new word to a server in command of disseminating dictionary and glossary information. The dissemination process is described in greater detail further below.

If the user agrees that the unidentified word is a misspelled word and believes that the unidentified word should be replaced with the word suggested by the spell checker, then the user may select CHANGE button 812, which will replace the unidentified word with the suggested word.

If the user believes that the unidentified word is a correctly spelled acronym or special term, the user may select "ADD TO GLOSSARY" button 816 that informs the spell checker to add the unidentified word to one of the glossary files as a correctly spelled acronym/term. The spell checker may then pop up another window in which the user may enter the expansion and definition of the new acronym/term. If no default file has previously been specified, then the user may be prompted to select a particular glossary into which the acronym should be placed. If the user desires to stop the spell checker, then the user may select CANCEL button 808.

Acronym box 830 presents a word that has previously been identified as an acronym and may have been retrieved from a glossary. In this case, the acronym box contains the acronym "PCX" which is the closest acronym that approximates the spelling of the currently unidentified word. The acronym box also contains the expansion of the suggested acronym. Alternatively, the expansion of the acronym may be provided in a separate window box. Definition box 850 contains the definition for the acronym presented within acronym box 830.

"VIEW GLOSSARY" button 840 provides the user with the ability to view the remaining contents of the glossary. This may be helpful if the user has misspelled the acronym but believes that the spelling is approximately correct and would like to view the spelling of other acronyms.

Window 800 also contains Auto Expand control 820 for allowing the user to specify an option for the automatic expansion of the displayed acronym/term within the current document. Radio buttons 822 and 824 allow the user to toggle the feature on and off. If the user selects this feature, the acronym/glossary tool will insert an expansion of an acronym/term automatically into the current document in close proximity to the foremost occurrence of the acronym/term in the document.

"OPTIONS" button 842 may provide the user with the ability to specify rules for resolving conflicts in the retrieval and expansion of acronyms from multiple sources. For example, the acronym "PCX" may be found in several glossaries, and the acronym/glossary tool may provide the user with the ability to specify a ranking for each source. In the case in which the acronym/glossary tool finds an identical acronym in multiple source files, if the user has previously specified that the ranking for a user glossary is higher than the standard glossary, then the acronym/glossary tool may present the user with an expansion and definition for the acronym from the user glossary, and the user could then request to view the information retrieved from the standard glossary.

Drop-down menu 844 displays the source of the acronym in acronym box 830. In this case, "PCX" has been retrieved from User Glossary A. The user may see other sources for identically spelled acronyms by selecting one of the menu items in drop-down menu 844. For example, if another glossary had an acronym "PCX", even if the acronym had a different expansion and definition, then the user could view the acronym by selecting the appropriate source file in the drop-down menu.

Figure 9:
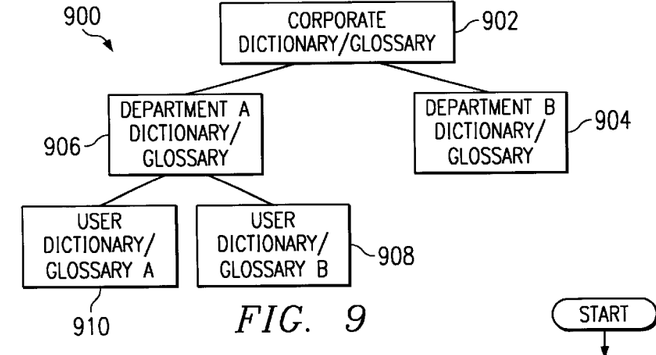
FIG. 9 is a pictorial representation depicting a set of hierarchically arranged glossaries.

With reference now to FIG. 9, a block diagram depicts a set of hierarchically arranged glossaries and dictionaries. FIG. 9 describes the files as dictionary/glossaries in a manner in which dictionary-type information for a set of particular words may be combined with glossary-type information so that any information related to a particular word may be found in a single file. Alternatively, glossary-type information and dictionary-type information may be stored in different files.

User Dictionary/Glossary A 910 and User Dictionary/Glossary B 908 are depicted as child dictionaries/glossaries of parent dictionary/glossary 906. Department A Dictionary/Glossary 906 and Department B Dictionary/Glossary 904 are depicted as child dictionaries/glossaries of parent dictionary/glossary 902. Corporate Dictionary/Glossary 902 is depicted as the root glossary. However, alternate configurations of dictionaries and glossaries could be depicted in which other organizational entities are depicted within the tree of dictionaries and glossaries, such as subdepartments, divisions, etc.

The hierarchical set of dictionaries and glossaries serves as a conceptual representation of the manner in which a user may view the storage of the dictionaries and glossaries. This conceptual representation may reflect the structure of the organization in which the dictionaries and glossaries are being used. A server which maintains these dictionaries and glossaries may retrieve information about the structure of the organization from a corporate organizational database, such as database 452 shown in FIG. 4. Although the dictionaries and glossaries may be stored in a data structure that reflects the organizational structure, the dictionaries and glossaries may be stored in any number of different manners, and a dictionary server or a glossary server, through its various interfaces, creates an appearance that the dictionaries or glossaries are stored in a hierarchical manner.

The present invention allows a user to share new word, new acronym, or new term information with other persons within the same workgroup, department, division, corporation, etc. The server, through appropriate links with the system administration software, such as session management, etc., can determine the appropriate organizational information for each user that is accessing the hierarchical set of words. In this manner, the organizational unit builds a database of information that is specifically tailored to the needs of the users within the organizational unit.

Each time that the user requests to save a new spelling of a word, an expansion or definition of a new acronym, or a special term, the user may specify a file to which the user desires to store the information. Although the spell checker tool or acronym/glossary tool may already have a default file, the user may specify a file according to the user's preference. If the user believes that the new word should be stored at a department level so that other persons within the department may benefit from the information, then the user may request that the new word be stored in the dictionary or glossary for the department. In a similar manner, the user may request that the new word be stored in the dictionary or glossary for the corporation or some other organizational unit.

Figure 10:
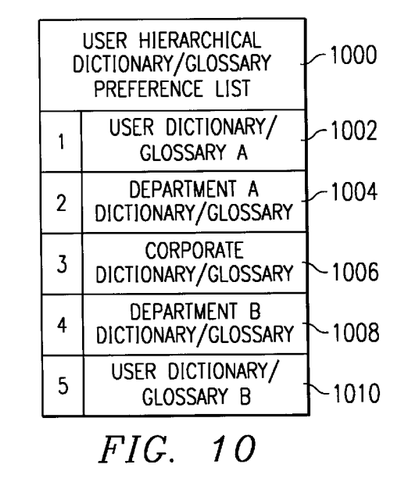
FIG. 10 is a pictorial representation depicting a specific user's preference list for the manner in which a set of hierarchically arranged glossaries are to be searched.

With reference now to FIG. 10, a pictorial representation depicts a specific user's preference list for the manner in which a set of hierarchically arranged dictionaries or glossaries are to be searched. FIG. 10 describes the files as dictionary/glossaries in a manner in which dictionary-type information for a set of particular words may be combined with glossary-type information so that any information related to a particular word may be found in a single file. Alternatively, glossary-type information and dictionary-type information may be stored in different files.

List 1000 shows a priority list for the manner in which a set of dictionaries or glossaries are to be searched. Although the user may perceive that a set of dictionaries or glossaries are hierarchically arranged, each user may specify a preferential ranking for the manner in which information retrieved from the dictionaries or glossaries are to be presented to the user. Each user's list may be stored in a user profile on the server, on the client, or within the spell checker tool or acronym/glossary tool.

Preference list entries 1002–1010 allow the user to choose an order for the retrieval of information from the set of hierarchical dictionaries or glossaries. If more than one dictionary or glossary in the set of dictionaries or glossaries has information that may be pertinent to the word that is searched, then the information is presented to the user in the manner previously selected by the user according to the ranking of the entry within the list. If the user has not previously specified a preference list, then the information may be presented in a default manner, for example, according to the informational structure present in a corporate organizational database.

Figure 11A:
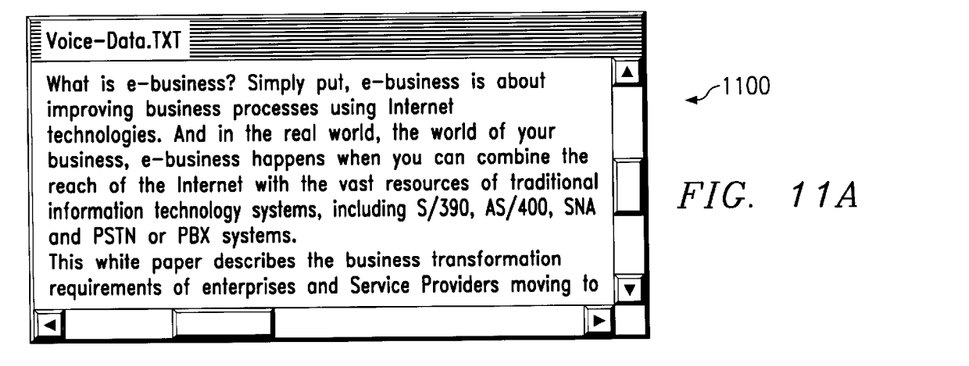
FIG. 11 is a diagram depicting a standard document window within a graphical user interface in which a user is presented with a choice of information retrieved from multiple glossaries.
Figure 11B:
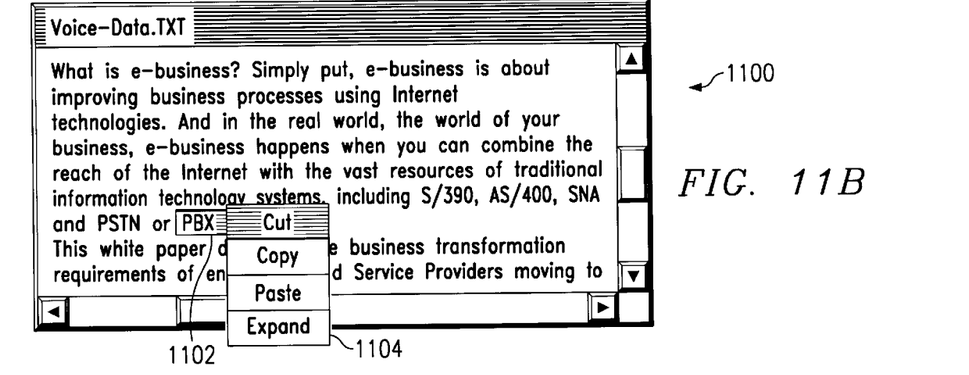
Figure 11C:
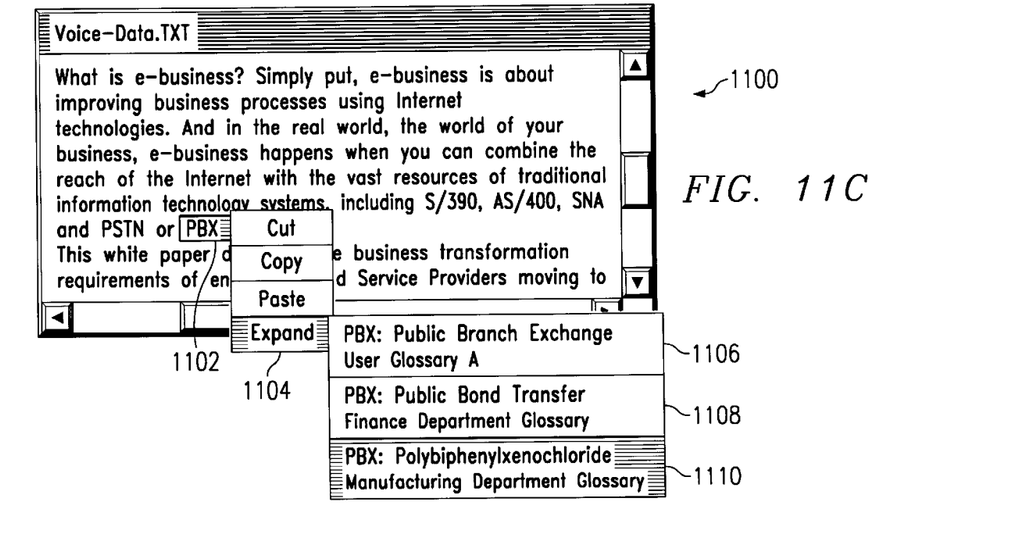

With reference now to FIGS. 11A–11C, a diagram depicts a standard document window within a graphical user interface in which a user is presented with a choice of information retrieved from multiple glossaries. FIG. 11A shows a document window 1100 containing multiple acronyms. FIG. 11B shows the selection of acronym 1102, after which the user is presented with a menu from which the user may choose an appropriate action for the selection. Alternatively, the user clicks the right mouse button to see the menu of actions, or the user simply right-clicks the acronym without selecting the acronym.

One of the actions that is presented to the user is "Expand" menu item 1104. The application has determined in the background that the word that the user has selected is an acronym. By searching through the available glossaries, the application, either alone or executing in conjunction with the acronym/glossary tool, has found at least one glossary entry for the word, and the application provides the user with the ability to insert the expansion of the acronym in close proximity to the acronym.

FIG. 11C shows the selection of the "Expand" menu item by the user. The menu of actions is a hierarchical menu, and after the user has selected the "Expand" menu item, the application presents the choice of acronyms to the user as a submenu. In this case, the application has communicated with a server to retrieve a set of identically spelled acronyms "PBX" that have different meanings. Menu item 1106 contains "PBX: Public Branch Exchange" retrieved from a personal user glossary named "User Glossary A". Menu item 1108 contains "PBX: Public Bond Transfer" retrieved from a departmental glossary named "Finance Department Glossary". Menu item 1110 contains "PBX: PolyBiphenylXenochloride" retrieved from a departmental glossary name "Manufacturing Department Glossary". Alternatively, the name of the glossary file is not shown, or other information pertinent to the acronym may be shown, such as a definition for the acronym. Once the user has selected an expansion for the acronym, then the application may insert the expansion in close proximity to the acronym, as shown in FIG. 7.

The application has presented the retrieved acronyms in the order specified by the user in a hierarchical preference list similar to the list shown in FIG. 10. In this case, the user has specified that information from User Glossary A should be presented before information from the Finance Department Glossary, which should be presented before the information from the Manufacturing Department Glossary.

If a user is editing a document, and the user has previously selected an "auto-expand" option similar to that shown in FIG. 8, then each time that the user types a word that the application recognizes as an acronym, then the application may pop-up a dialog box or a menu similar to that shown in FIG. 11C to allow a user to select the acronym expansion that is best associated with the content of the document.

Figure 12:
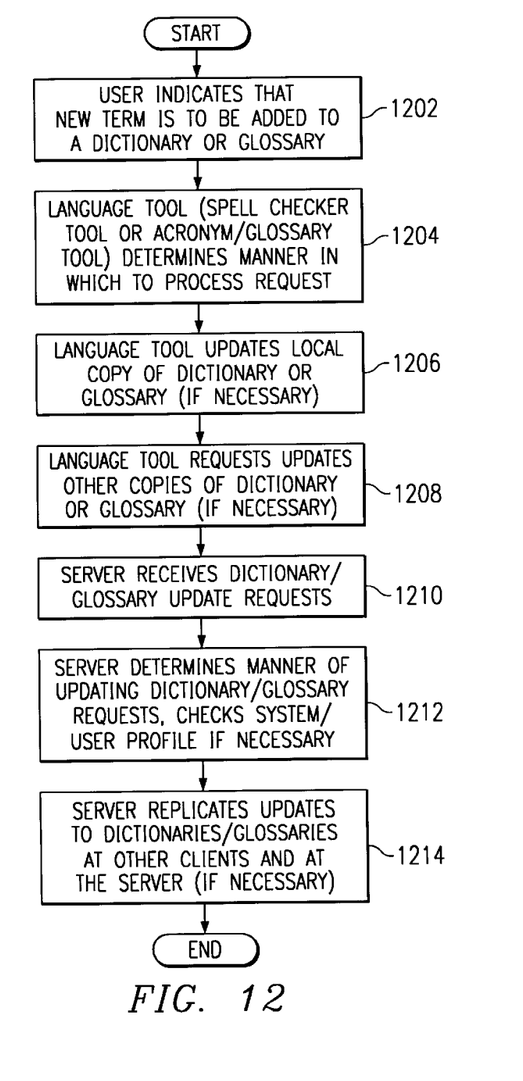
FIG. 12 is a flowchart depicting a manner in which changes to dictionaries and glossaries may be disseminated throughout an organization.

With reference now to FIG. 12, a flowchart depicts a manner in which changes to dictionaries and glossaries may be disseminated throughout an organization. The process begins when a user of an application with an associated language tool, either a spell checking tool or acronym/glossary tool, determines that a new word should be added to a dictionary or glossary (step 1202). Depending on options selected by a user on the client computer, the language tool may need to determine the manner in which the user's update request should be processed (step 1204).

If the user specifies a particular dictionary or glossary, then the language tool may store the new word or acronym, or may request the storage of the new word or acronym, in the specified file. If the specified file is located locally on a client computer, then the language tool may update the local file (step 1206). If the specified file is located centrally on a server or elsewhere within the network, then the language tool may send the appropriate update request to the appropriate server (step 1208).

The user may have the ability to set several options within the language tool for requesting dictionary or glossary updates. For example, each time the user requests an update, the language tool may send an update request to the server, whether or not a specific dictionary or glossary file has been specified. Various selectable options may be chosen by the user or by a system administrator as to the manner in which an update to a dictionary or glossary file is disseminated throughout a network.

When the server receives an update request (step 1210), the server determines the appropriate files to be updated. This may require checking a system administration file or user profile file to lookup any rules for the manner in which update requests from the user are to be processed (step 1212). These update rules may reflect a corporate organizational structure or may require lookups in an organizational database.

For example, the server may update only a departmental dictionary or glossary for this particular user. In this case, it may have been determined that new terms from this user and similar users are usually only needed or helpful to other people within the same department. If the engineering department frequently uses terms that are only useful to fellow engineers, then the server may not replicate the update to any other dictionaries or glossaries outside of the engineering department. This type of rule may be set as a default for all persons within a department and overridden on a per-user basis, etc.

As another example, any update requests from another user may require an update to a corporate-level dictionary or glossary. If the human resources department frequently uses terms that must be understood by all employees so that each employee understands a company benefit plan, then these updates may be replicated to a corporate-level file.

The update rules for determining which files to update may also specify that an update to a dictionary or glossary at a particular organizational level is to be disseminated to any person within the particular organizational level. In this case, the server replicates the update to the appropriate persons at the appropriate client computers that have copies of the dictionary or glossary (step 1214). These updates may be sent whenever the client application notifies the server that the application is in use. Alternatively, the client may configured with the appropriate system information so that the client determines which copies of the dictionary or glossary must be updated.

New words and terms may be disseminated almost immediately throughout an organization by modifying the rules by which the dictionaries or glossaries are updated. If an update to a central dictionary or glossary is always replicated from a server to other copies of the dictionary or glossary on multiple clients and vice versa, then the copy on the server may be regarded as a master copy, and each copy of the dictionary or glossary may be kept synchronized and coherent with the master dictionary or glossary.

The processing methods and tools of the present invention provides a user with a convenient manner for creating a document or datastream that is more readable. New words and acronyms may be stored and retrieved from a dictionary or glossary that may be one of a set of dictionaries or glossaries that are organized hierarchically in a manner similar to the organizational hierarchy of the users which use the dictionaries or glossaries.

By storing and retrieving word information in a hierarchical fashion, the dictionaries and glossaries may be configured to the particular needs and purposes of the employees. In this manner, the dictionary or glossary will tend to match the context of the content of the documents that are created and viewed by these employees. The employees may then assist other employees by replicating language information to other dictionaries or glossaries so that other employees may insert the language information into other documents or may use the language information to understand other documents.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for updating a plurality of dictionaries or glossaries, the method comprising the computer-implemented steps of:

executing an application on a first client, wherein the application accesses a local copy of a dictionary or glossary;

identifying a term or word to be added to the local copy of the dictionary or glossary;

sending a request to update a master dictionary or glossary with said term or word;

updating said master dictionary or glossary at a server;

identifying, in accordance with predetermined update criteria for determining which files to update, said update criteria specifying that an update to a dictionary or glossary at a particular organizational level of a plurality of organizational levels is to be disseminated to said first client and at least a second client within said particular organizational level, at least one file of the local copy of the dictionary or glossary to update; and serving the update to the master dictionary or glossary to the application on the first client to update the at least one file of the local copy of the dictionary or glossary, wherein a dictionary comprises spellings and definitions of terms or words, and wherein a glossary comprises explanatory words or explanatory phrases for a list of terms or words found in an associated document or datastream.

2. The method of claim 1 further comprising:

defining a new term at the first client; and responsive to a determination that the new term is missing from the local copy of the dictionary or glossary at the first client, sending a message comprising the new term to the server to update the master dictionary or glossary.

3. The method of claim 2 wherein the new tern is an acronym.

4. The method of claim 1 wherein a dictionary or a glossary is a member of a hierarchical set of dictionaries or glossaries associated with organizational units, and the predetermined update criteria is associated with an organizational hierarchy.

5. A data processing system for updating a plurality of dictionaries or glossaries, the data processing system comprising:

executing means for executing an application on a first client, wherein the application accesses a local copy of a dictionary or glossary;

first identifying means for identifying a term or word to be added to the local copy of the dictionary or glossary;

sending means for sending a request to update a master dictionary or glossary with said term or word;

updating means for updating said master dictionary or glossary at a server;

second identifying means for identifying, accordance with predetermined update criteria for determining which files to update, said update criteria specifying that an update to a dictionary or glossary at a particular organizational level of a plurality of organizational levels is to be disseminated to said first client and at least a second client within said particular organizational level, at least one file of the local copy of the dictionary or glossary to update; and server means for serving the update to the master dictionary or glossary to the application on the first client to update the at least one file of the local copy of the dictionary or glossary, wherein a dictionary comprises spellings and definitions of terns or words, and wherein a glossary comprises explanatory words or explanatory phrases for a list of terms or words found in an associated document or datastream.

6. The data processing system of claim 5 further comprising:

defining means for defining a new term at the first client; and sending means for sending, in response to a determination that the new term is missing from the local copy of the dictionary or glossary at the client, a message comprising the new term to the server to update the master dictionary or glossary.

7. The data processing system of claim 6 wherein the new term is an acronym.

8. The data processing system of claim 5 wherein a dictionary or a glossary is a member of a hierarchical set of dictionaries or glossaries associated with organizational units, and the predetermined update criteria is associated with an organizational hierarchy.

9. A computer program product in a computer-readable medium for use in a data processing system for updating a plurality of dictionaries or glossaries, the computer program product comprising:

first instructions for executing an application on a first client, wherein the application accesses a local copy of a dictionary or glossary;

second instructions for identifying a term or word to be added to the local copy of the dictionary or glossary;

third instructions for sending a request to update a master dictionary or glossary with said term or word;

fourth instructions for updating said master dictionary or glossary at a server;

fifth instructions for identifying, in accordance with a predetermined update criteria for determining which files to update, said update criteria specifying that an update to a dictionary or glossary at a particular organizational level of a plurality of organizational levels is to be disseminated to said first client and at least a second client within said particular organizational level, at least one file of the local copy of the dictionary or glossary to update; and sixth instructions for serving the update to the master dictionary or glossary to the application on the first client to update the at least one file of the local copy of the dictionary or glossary, wherein a dictionary comprises spellings and definitions of terms or words, and wherein a glossary comprises explanatory words or explanatory phrases for a list of terms or words found in an associated document or datastream.

10. The computer program product of claim 9 wherein a dictionary or a glossary is a member of a hierarchical set of dictionaries or glossaries associated with organizational units, and the predetermined update criteria is associated with an organizational hierarchy.

* * * * *

UNITED STATES PATENT AND TRADEMARK OFFICE
CERTIFICATE OF CORRECTION

PATENT NO. : 6,785,869 B1
DATED : August 31, 2004
INVENTOR(S) : Berstis

It is certified that error appears in the above-identified patent and that said Letters Patent is hereby corrected as shown below:

Column 13,
Line 15, after "new" delete "tern" and insert -- term --.
Line 34, after "for identifying," insert -- in --.
Line 47, after "of" delete "terns" and insert -- terms --.

Signed and Sealed this

Twenty-fifth Day of October, 2005

JON W. DUDAS
*Director of the United States Patent and Trademark Office*